Aug. 30, 1927.

W. F. STOODY 1,640,859

MACHINE FOR MAKING WELDING RODS

Filed Aug. 7, 1925     6 Sheets-Sheet 2

Aug. 30, 1927.

W. F. STOODY

1,640,859

MACHINE FOR MAKING WELDING RODS

Filed Aug. 7, 1925   6 Sheets-Sheet 4

Inventor:
Winston F. Stoody
by Hazard and Miller
Attorneys

Aug. 30, 1927.

W. F. STOODY 1,640,859

MACHINE FOR MAKING WELDING RODS

Filed Aug. 7, 1925  6 Sheets-Sheet 6

Patented Aug. 30, 1927.

1,640,859

UNITED STATES PATENT OFFICE.

WINSTON F. STOODY, OF WHITTIER, CALIFORNIA.

MACHINE FOR MAKING WELDING RODS.

Application filed August 7, 1925. Serial No. 48,752.

This invention relates to improvements in machines for making welding rods.

An object of the invention is to provide a machine for making a welding rod having a metallic sheath in which a wire core is disposed and which encloses an alloy, the machine being so constructed that a continuous metallic tape can be fed to the machine and a continuous wire core together with the alloy can also be supplied, and the machine will turn out a continuous completed welding rod, which may be cut up into desired lengths.

The machine consists essentially of three sets of rolls, through which the tape or ribbon passes, these rolls deforming the tape so as to trough it, and the alloy is then deposited in the trough. The rolls further partially close the tape about the alloy and the wire core is then inserted therein, after which the rolls compress the tape about the wire core and the alloy so that the alloy will be firmly held within the tape.

Heretofore machines for making welding rods have been provided using dies for deforming the tape in providing the metallic sheath, but these machines have been found impractical and disadvantageous for any one of a number of reasons, which will hereinafter be more specifically pointed out.

With the foregoing and other objects in view which will be made manifest in the following detailed description and specifically pointed out in the appended claims, reference is had to the accompanying drawings for an illustrative embodiment of the invention, wherein:

Fig. 14 is a partial perspective view of a portion of the completed welding rod, which is the finished product of the machine.

Figure 4:
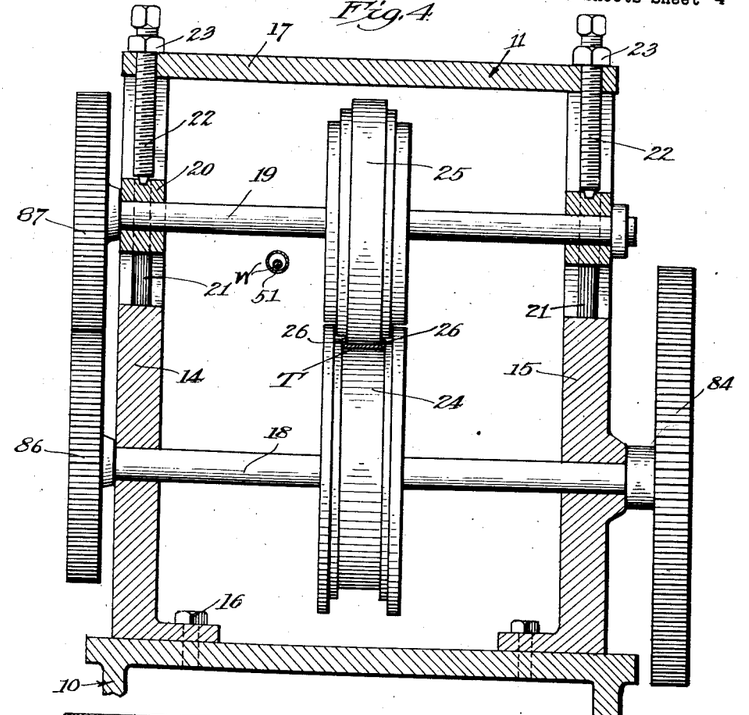
Fig. 4 is a vertical section taken substantially on the line 4—4 of Fig. 1.

Referring to the accompanying drawings wherein similar reference characters designate similar parts throughout, the machine is shown as being embodied upon a suitable supporting table 10, upon which three inverted U-shaped yokes or standards are mounted. These standards are indicated generally at 11, 12 and 13 respectively. Referring to Fig. 4 for a detail view of the standard 11 and the rolls carried thereby, this standard consists of two uprights 14 and 15 bolted to the supporting table as by bolts 16. A cross bar 17 connects the upper ends of the uprights 14 and 15. A horizontal shaft 18 has its ends rotatable in the uprights 14 and 15 and carries one of the first set of rolls. A second horizontal shaft 19 has its ends rotatable in bearing blocks 20 and carries the other of the first set of rolls through which the tape passes. The upper ends of the uprights 14 and 15 are slotted to receive the bearing blocks 20, and upon the opposed walls of the slots there are formed guide ribs 21, which are receivable in grooves upon the bearing blocks 20. The bearing blocks 20 are slidable to provide adjustment of the shaft 19, so that the rolls may be adjusted with respect to each other. The bearing blocks 20 can be held in adjusted position by means of set screws 22, which are threaded into the cross bar 17 and have their lower ends engageable on the bearing blocks. Lock nuts 23 hold the set screws in adjusted position. The lower roll of the first set is provided with a groove, indicated at 24, which is slightly less in width than the width of the tape or ribbon which is fed to the machine, and the upper roll is provided with a bead or projection 25 which is receivable in the groove 24. Consequently, when the tape or ribbon T passes through the first rolls, it has its side edges bent upwardly, as indicated at 26, to form a trough of the tape.

Figure 1:
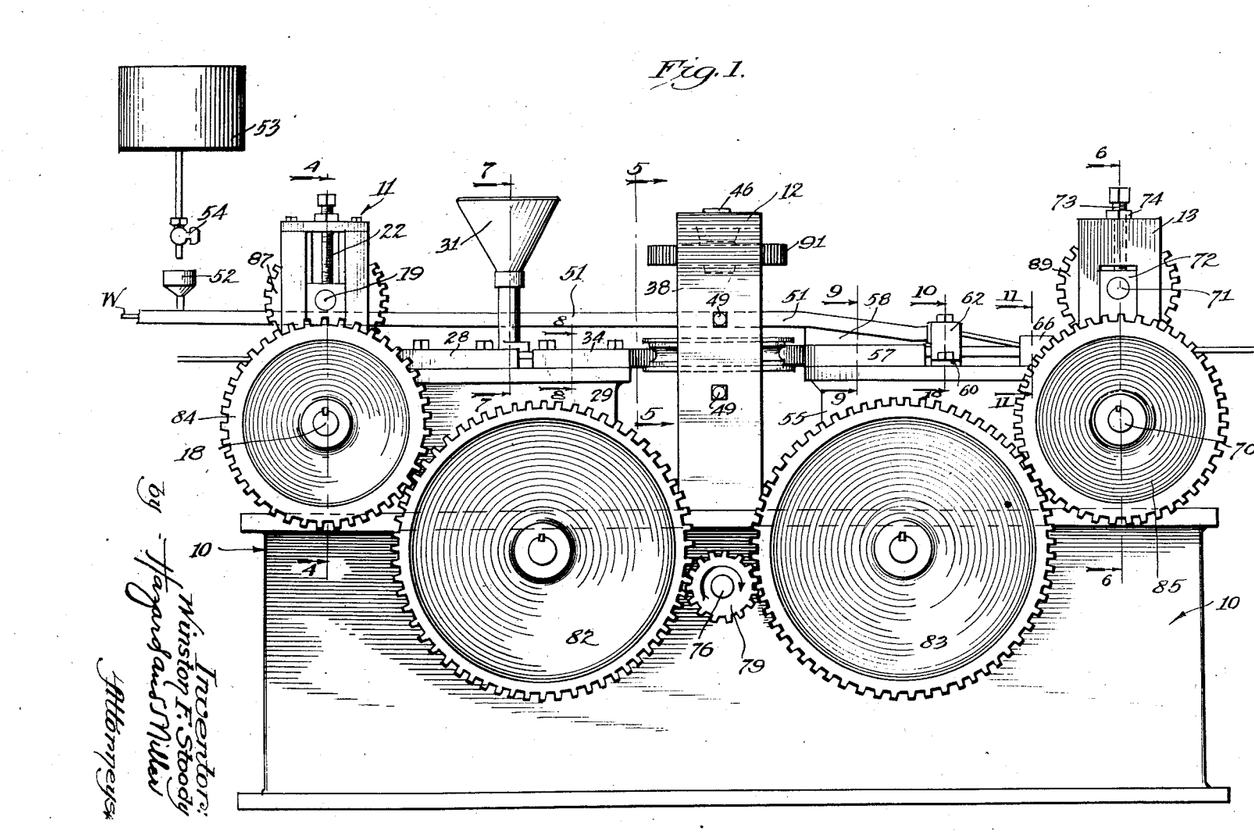
Figure 1 is a side elevation of the improved welding rod machine.
Figures 2, 12:
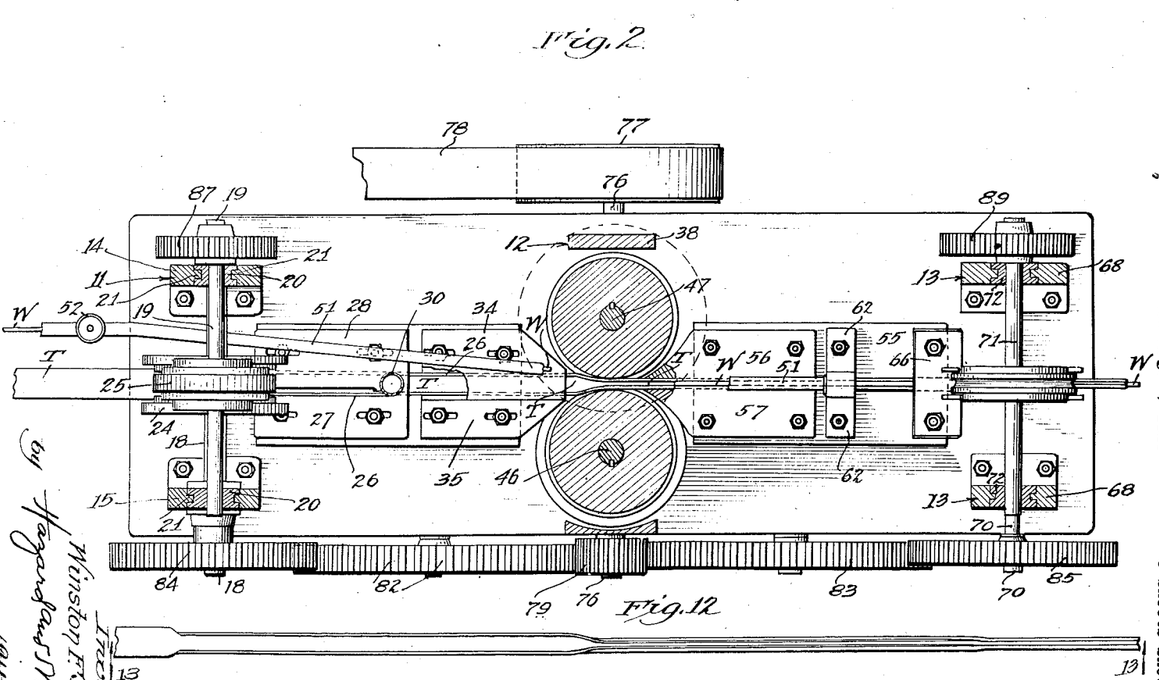
Fig. 2 is a top plan view of the improved machine, parts being broken away and shown in section.
Fig. 12 is a top plan view of the metallic tape or ribbon illustrating how it is deformed as it passes through the various rolls upon the machine.
Figure 3:
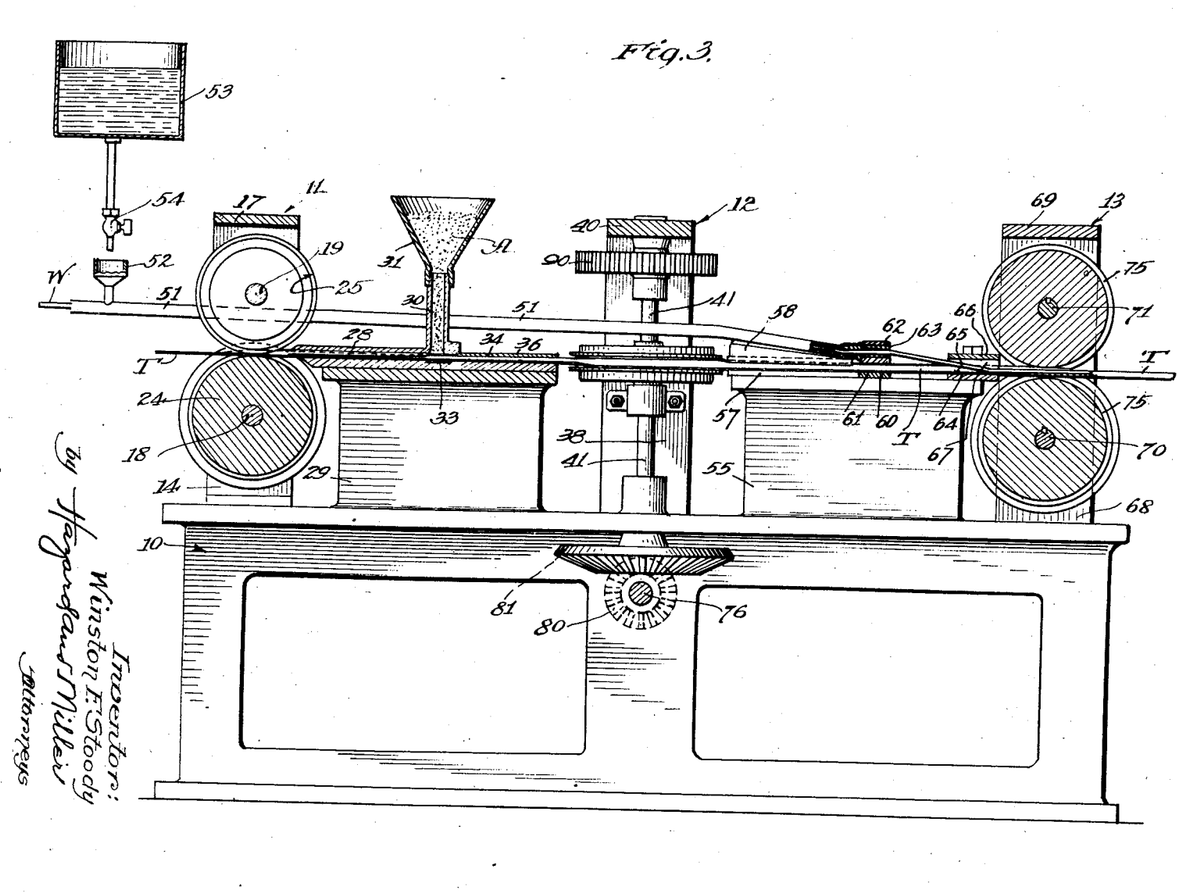
Fig. 3 is a vertical section through the machine, taken through the centers of the various rolls.
Figure 8:
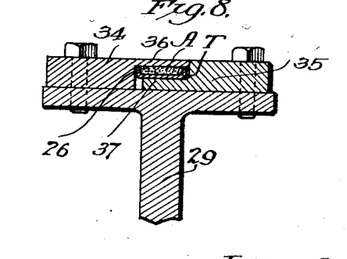

After the tape T passes through the first rolls, it enters between a pair of guide plates 27 and 28. These guide plates are mounted upon a suitable supporting web 29 on the supporting table 10 and have overlapping flanges, such as those which are shown in Fig. 8. The troughed tape T passes between the overlapping flanges and at the end of the guide plate 28 there is formed a tubular stem 30, on top of which a conical hopper 31 is mounted. The forward side of the tubular stem 30 is closed or in other words bears against the top of the tape T. The rearward side of the tubular stem 30 is open, as shown at 32, so that as the tape T passes beneath the stem 30, an alloy or the like placed in the hopper 31 is continually deposited upon the troughed tape and passes from within the stem 30 through the opening 32. The amount of alloy which is deposited on the tape depends upon the size of the opening 32 in the rearward side of the stem 30. This opening may be varied slightly and any wear which occurs upon the guide plates 27 and 28 can be taken up by means of a removable shim 33, shown in Fig. 3. Obviously, this shim can be replaced by means of an adjustable set screw, if found desirable. After the tape passes beneath the tubular stem 30 to receive the alloy, it passes through a second set of guide plates 34 and 35, having overlapping flanges 36 and 37. These guide plates are also supported upon the supporting web 29 and as the tape passes between the flanges, the alloy A is somewhat distributed between the up-turned sides of the tape.

Figure 5:
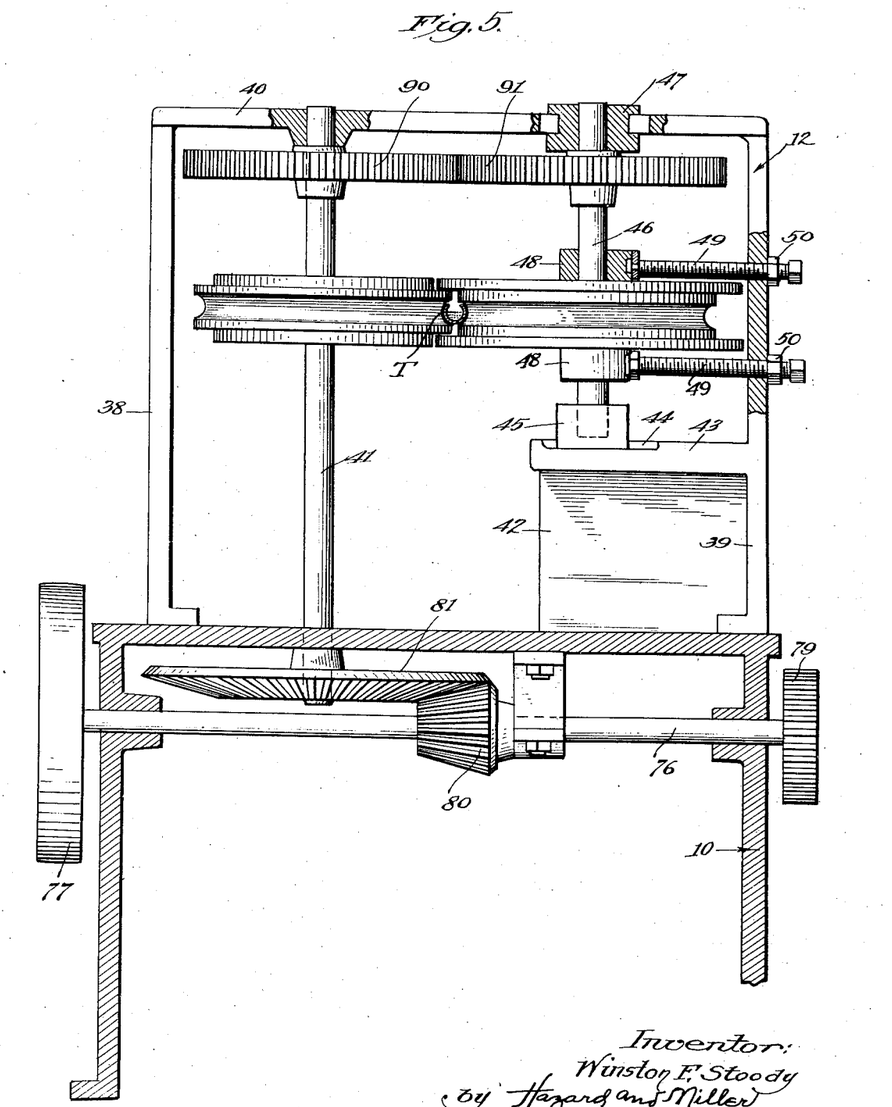
Fig. 5 is a view taken substantially on the line 5—5 of Fig. 1.
Figure 6:
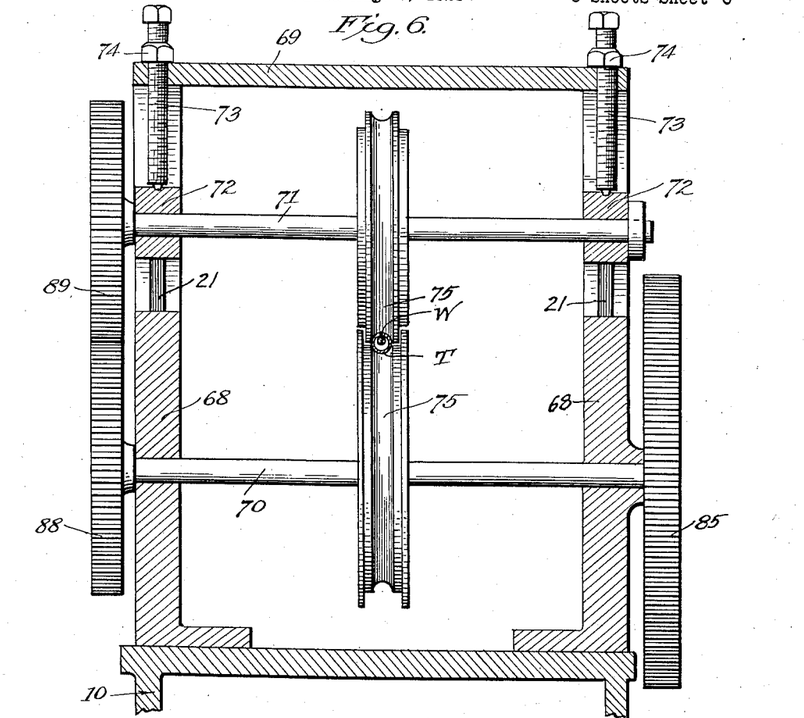
Fig. 6 is a vertical section taken on the line 6—6 of Fig. 1.
Figure 7:
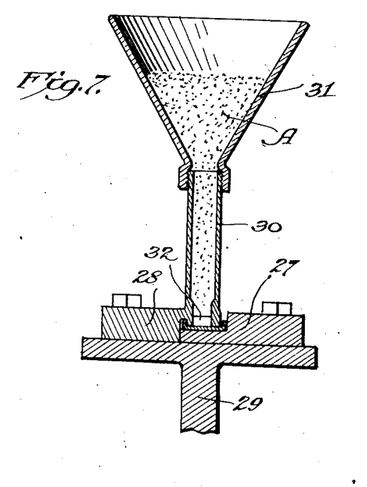
Fig. 7 is a vertical section through the hopper through which the alloy is fed to the machine, and may be considered as taken on the line 7—7 of Fig. 1, Figs. 8, 9, 10 and 11 are vertical sections taken on the lines 8—8, 9—9, 10—10 and 11—11 respectively upon Fig. 1.

On leaving the guide plates 34 and 35, the tape passes between the second set of rolls which are mounted upon the standard 12. This standard is illustrated in detail upon Fig. 5 and consists of two uprights 38 and 39, which are connected by means of an upper cross bar 40. A vertical shaft 41 has its lower end rotatably mounted in the top of the supporting table 10, and has its upper end rotatable in the cross bar 40. This shaft carries one of the second set of rolls. On the upright 39 there is provided a reinforcing web 42 resting upon the top of the supporting table 10, and which reinforces a projecting arm 43, in which a cup-like depression 44 is formed. A bearing 45 is slidable in the cup-like depression 44 and constitutes the bearing for the lower end of the shaft 46. In the cross bar 40 there is provided a slot in which a bearing 47 is slidable, in which bearing the upper end of the shaft 46 is rotatable. The shaft 46 carries the other roll of the second set of rolls on the machine. Suitable collars 48 are also provided upon the shaft 46 which are engageable by means of set screws 49, which are threaded into the upright 39 and are held in adjusted position by means of lock nuts 50. These set screws adjust the roll carried by the shaft 46 with respect to the roll carried by the shaft 41. These rolls are complementary and have semi-circular grooves formed on their peripheral faces. They are locked in a horizontal position and as the tape T, which has its side edges bent upwardly and which carries the alloy A between the up-turned sides, passes between the second set of rolls, the sides are rounded up about the alloy, as shown in Fig. 5. The second set of rolls does not attempt to close the tape T about the alloy, but on the contrary the side edges of the tape are left spaced apart, permitting the wire core of the welding rod to be inserted between them.

The wire core, indicated at W, is fed to the machine through a tubular conduit, such as a section of pipe 51. This section of pipe is provided on its forward end with a small cup 52, in which a solution from a reservoir 53 may be fed through a valve 54. This solution may be varied or in some instances it may be eliminated entirely. Preferably, however, the solution is water glass and performs various functions hereinafter specifically stated.

Figure 9:
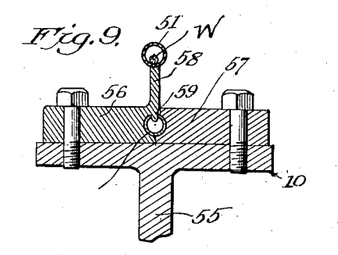
Figures 10, 14:
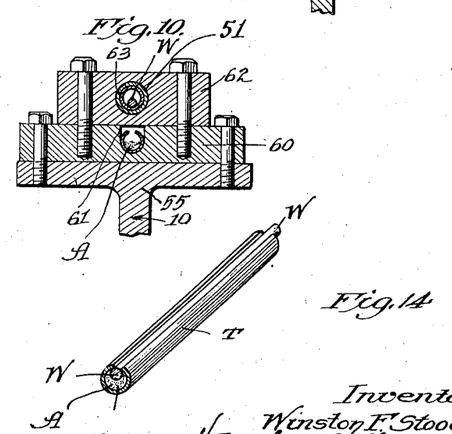
Figure 11:
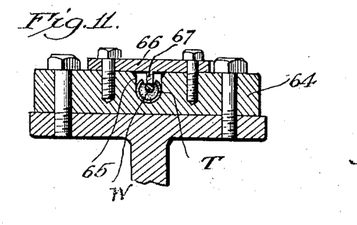
Figure 13:
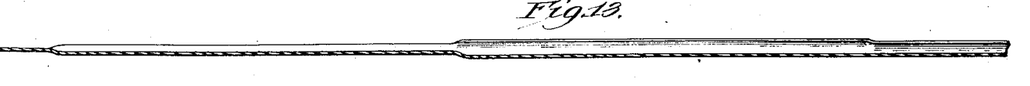
Fig. 13 is a section through the tape and may be considered as taken on the line 13—13 of Fig. 12.

Behind the second set of rolls there is mounted a supporting web 55, on which two guide plates 56 and 57 are mounted. A detail of these guide plates is shown in Fig. 9. The opposed faces of the guide plates 56 and 57 are provided with arcuate grooves in which the rounded tape T slides. On the guide plate 56 there is formed a supporting rib 58, which supports the rearward end of the tubular conduit or pipe section 51. On the lower end of the supporting rib 58 there is provided a small tit or depending projection 59, which is positioned between the edges of the rounded tape, so that the rounded tape is prevented from turning over as it passes between the guide plates from the second set of rolls.

Behind the guide plates 56 and 57 there is mounted on the supporting web 55 another guide plate 60, on the top surface of which a groove 61 is formed, and through which the curled or rounded tape T passes. The top of the slot is closed by means of supporting blocks 62, between which the rear end of the pipe section 51 is held. These supporting blocks 62 also hold a hardened steel ferrule 63 which resists the wear of the wire core W as it passes from within the pipe section 51 downwardly so as to be positioned within the tape.

Immediately before the third set of rolls there is positioned a guide plate 64 on the supporting web 55. This guide plate is similar in construction to the guide plate 60 having a groove 65 formed on its upper surface, which is closed by means of a small plate 66. On the under side of the small plate 66 there is a depending rib 67 having its lower edge concaved and which serves as a guide for positioning the wire core W within the rounded tape. This rib extends downwardly between the opposed edges of the tape and also serves the purpose of preventing the tape from turning over. It will be readily appreciated that the wire core W passes from the hardened ferrule 63 directly under the rib 67, so as to be positioned within the rounded tape or ribbon.

The third standard 13 is very similar in construction to the first standard 11 and consists of uprights 68 mounted on the supporting table 10 which have their upper ends slotted and are connected by means of a cross bar 69. A horizontal shaft 70 is rotatable in the uprights 68 and a second horizontal shaft 71 has its ends rotatable in bearing blocks 72 which are slidable in the slots on the upper ends of the uprights 68. Grooves are also provided upon the bearing blocks 72 in which guide ribs on the uprights 68 are received. The bearing blocks 72 are held in adjusted position by means of set screws 73 which are locked by means of lock nuts 74. The shafts 70 and 71 carry the third pair of rolls. These rolls are similar in form to the rolls of the second set having semi-circular grooves 75 formed on their peripheral surfaces, which grooves are of a smaller radius of curvature than the radius of curvature of the grooves on the second pair of rolls. Consequently, when the rounded tape T, carrying the alloy A on which the wire core W is positioned, passes through these rolls, it is compressed about the wire core and the alloy, so as to enclose the alloy within the sheath so formed. It is not essential that the opposed edges of the rounded tape meet each other, but on the contrary they are somewhat spaced apart, but are pressed tightly against the wire core, the wire core serving as a closure between the meeting edges, preventing the escape of the alloy.

Heretofore a type of welding rod has been provided, in which the wire core W is located centrally of the alloy within the sheath, and the edges of the tape abut each other. The improved form of welding rod has some advantages over this construction, although it may not present as attractive an appearance. When the welding rod having the wire core disposed centrally within the sheath is used in electric welding, all of the current is carried by the metallic sheath, or practically so, for the reason that the alloy is a poor electrical conductor. Consequently, the wire core, which supplies the desired amount of iron to the welding rod, conducts practically no electric current.

In the improved form of welding rod, the edges of the tape or sheath are firmly pressed against the wire core so that a good electrical contact is established therebetween. Consequently, in the improved form of welding rod, the wire core as well as the sheath conducts its portion of the electric current in arc welding.

The purpose of supplying a solution of water glass to the pipe 51 is for several reasons. This solution forms a lubricant, facilitating the drawing of the wire core W through the pipe 51, and as the wire core is drawn through the pipe, it becomes thoroughly covered or wetted with the solution. When the wire core is positioned within the tape on top of the alloy therein, the solution moistens the alloy and serves as a binder. Furthermore, the solution also provides a slight lubricant for the third set of rolls, which is quite advantageous for the reason that the third set of rolls exert the greatest pressure upon the tape, this being necessary in order to firmly press the side edges of the tape on top of the wire core. After the tape or ribbon has passed through the third set of rolls, this solution acts as a sealing medium for sealing any openings which may be present between the edges of the tape and the wire core W. The solution, however, does not remain wet within the welding rod, as only a small quantity is carried by the wire core, and after the welding rod has been formed, the solution slowly dries out.

As a means for driving the rolls on the machine, a horizontal shaft 76 is rotatably mounted upon the legs of the supporting table 10. This horizontal shaft is provided on one end with a pulley 77, so that the shaft may be rotated from any suitable source of power by means of a belt 78. On the other end of the shaft 76 there is provided a pinion 79, and intermediate the legs of the supporting table 10 a beveled pinion 80 is keyed on the shaft. This beveled pinion meshes with a beveled gear 81 keyed on the lower end of the shaft 41 beneath the top of the supporting table. On the side of the supporting table, idler gears 82 and 83 are mounted, which mesh with the pinion 79. On the ends of the shafts 18 and 70 there are keyed gears 84 and 85, which mesh with the idler gears 82 and 83 respectively. In this manner as the shaft 76 is rotated, the shafts 18 and 70 are also caused to rotate, but will be rotated in the opposite direction from the direction of rotation of the shaft 76. On the opposite end of the shaft 18 from the gear 84 there is keyed another gear 86, which meshes with a gear 87 on the shaft 19. Consequently, when the shaft 18 is driven by means of the shaft 76, the shaft 19 will also be driven so that the rolls will draw the tape T in between them from the source of supply and also deform the tape. In a similar manner the shaft 70 is provided with a gear 88 on the opposite end from the gear 85, which meshes with a gear 89 on the shaft 71. Consequently, both of the rolls of the third set will be driven together, and will draw the rounded tape between them while compressing it. On the upper ends of the shafts 41 and 46 there are gears 90 and 91, which mesh together. In this manner the single shaft 76 driven by means of the belt 78 will cause rotation of all of the rolls. It will be noted that one roll of each pair of rolls is adjustable relatively to the other roll of its respective pair. This adjustment is slight, but is permissible by reason of the fact that there is some loose play or back-lash between the gears.

The above described machine is very advantageous in forming welding rods, in that a continuous welding rod is formed which is perfect in its construction throughout its length. It is advantageous over machines using dies in that it may be operated at a much faster rate. In actual practice a machine of this construction can turn out the finished welding rod at the rate of one hundred feet per minute or better, which rate of production on a machine using dies is practically prohibited because of the heat and friction developed. Furthermore, the rolls do not wear as much as dies, and consequently the machine may be used a greater length of time without requiring replacement. A further advantage of this machine is made apparent in starting the machine. The tape supplied to the machine may be supplied from a spool and when one spool has been used up, a second may be started by merely inserting the end of the tape between the first set of rolls. Also when the wire core W has been exhausted from one spool, it is merely necessary to insert the end from a new spool through the pipe section 51, and cause it to enter between the third set of rolls. After this the machine may be started up and will continue in the production of the completed welding rod as before. In machines which use dies, however, considerable time and labor is required in re-starting the machine.

From the above it will be appreciated that an improved machine for making welding rods is provided, in which a tape, a wire core and an alloy are supplied to the machine and a finished welding rod will be formed from these materials. Although the machine has been described as placing an alloy in the rod, it will be readily appreciated that the same machine can also be used for placing a flux or other similar material in the rod, if so desired.

It will be understood that various changes in the detail of construction may be made without departing from the spirit or scope of the invention as defined by the appended claims.

I claim:

1. A machine for forming welding rods comprising rolls for turning up the sides of a steel tape so as to form a trough, means for depositing an alloy in the trough so formed, rolls for partially closing the tape about the alloy, means for positioning a wire core within the partially closed tape on top of the alloy, and rolls for compressing the tape about the alloy and wire core so as to form a closed welding rod containing the alloy.

2. A machine for forming welding rods comprising rolls for turning up the side edges of a steel tape so as to form a trough, means for depositing an alloy in the trough so formed, rolls for partially closing the tape about the alloy, means for feeding a wire core into the partially closed tape, means for feeding a solution into the tape, and rolls for compressing the tape about the core and alloy.

3. A machine for forming welding rods comprising a supporting table, a pair of vertical rolls mounted thereon adapted to turn up the side edges of a metallic tape passed therebetween so as to form a trough, means for feeding an alloy or the like into the trough so formed, a pair of grooved horizontal rolls adapted to round up the sides of the tape about the alloy as the tape carrying the alloy passes therebetween, means for depositing a wire core between the sides of the tape on top of the alloy, and a pair of grooved vertical rolls for compressing the side edges of the tape against said wire core so as to enclose the alloy within the tape.

4. A machine for forming welding rods comprising a supporting table, a pair of vertical rolls mounted thereon adapted to turn up the side edges of a metallic tape passed therebetween so as to form a trough, means for feeding an alloy or the like into the trough so formed, a pair of grooved horizontal rolls adapted to round up the sides of the tape about the alloy as the tape carrying the alloy passes therebetween, means for depositing a wire core between the sides of the tape on top of the alloy, a pair of grooved vertical rolls for compressing the side edges of the tape against said wire core so as to enclose the alloy within the tape, and means for coating said wire core with a solution before it is positioned within the tape as and for the purpose described.

5. A machine for forming welding rods comprising a supporting table, a pair of vertical rolls mounted thereon adapted to turn up the side edges of a metallic tape passed therebetween so as to form a trough, means for feeding an alloy or the like into the trough so formed, a pair of grooved horizontal rolls adapted to round up the sides of the tape about the alloy as the tape carrying the alloy passes therebetween, means for depositing a wire core between the sides of the tape on top of the alloy, and a pair of grooved vertical rolls for compressing the side edges of the tape against said wire core so as to enclose the alloy within the tape, all of said rolls being geardly connected together so that they may be driven by a single shaft.

6. A machine for making welding rods comprising a supporting table, three standards upon said supporting table, pairs of rolls mounted upon said standards, the first pair of rolls being adapted to turn up the side edges of a metallic tape passed therebetween, means for depositing an alloy upon the tape between the first and second rolls, the second pair of rolls being adapted to round up the sides of the tape about the alloy, and means for depositing a wire core upon the alloy within the tape between the second and third pairs of rolls, the third pair of rolls being adapted to press the edges of the tape against the wire core so as to enclose the alloy within the tape.

7. A machine for making welding rods comprising a supporting table, three standards upon said supporting table, pairs of rolls mounted upon said standards, the first pair of rolls being adapted to turn up the side edges of a metallic tape passed therebetween, means for depositing an alloy upon the tape between the first and second rolls, the second pair of rolls being adapted to round up the sides of the tape about the alloy, means for depositing a wire core upon the alloy within the tape between the second and third pairs of rolls, the third pair of rolls being adapted to press the edges of the tape against the wire core so as to enclose the alloy within the tape, and means for coating the wire core with a solution before being positioned upon the alloy as and for the purpose described.

8. A machine for making welding rods comprising a supporting table, three standards upon said supporting table, pairs of rolls mounted upon said standards, the first pair of rolls being adapted to turn up the side edges of a metallic tape passed therebetween, means for depositing an alloy upon the tape between the first and second rolls, the second pair of rolls being adapted to round up the sides of the tape about the alloy, means for depositing a wire core upon the alloy within the tape between the second and third pairs of rolls, the third pair of rolls being adapted to press the edges of the tape against the wire core so as to enclose the alloy within the tape, and means providing for adjustment of one roll of each pair of rolls.

9. A machine for forming welding rods comprising means for turning up the side edges of a metallic tape so as to trough it, means for depositing a material desirable in welding in the troughed tape, means for feeding a wire core into the tape on top of the material, and means for causing the side edges of the tape to be pressed against the wire core so as to cause the wire core to cooperate with the tape in enclosing the material within the tape.

10. A machine for forming welding rods comprising rolls for troughing a metallic tape, means for feeding a material desirable in welding into the troughed tape, rolls for partially closing the tape about the material, means for feeding a wire core into the tape on said material and additional rolls for completing the closing of the tape about the material and core.

11. A machine for making welding rods including means for moving a metallic tape longitudinally, means for troughing the tape, means for feeding a comminuted material onto the tape, means for depositing a liquid on the comminuted material in the tape, and means for closing the tape about the material.

12. A machine for making welding rods comprising rolls for troughing a metallic tape, means for depositing a comminuted material desirable in welding in the troughed tape, means for depositing a liquid in the tape, rolls for partially closing the tape, and additional rolls for causing the tape to maintain the material therein.

13. A machine for making welding rods comprising rolls for troughing a metallic tape, means for depositing a comminuted material desirable in welding in the troughed tape, means for depositing a liquid in the tape, rolls for partially closing the tape, and additional rolls for causing the tape to maintain the material therein, the rolls which partially close the tape being horizontally arranged so as to engage the sides of the troughed tape.

14. A machine for making welding rods comprising rolls for troughing a metallic tape, means for depositing a comminuted material desirable in welding in the troughed tape, means for depositing a liquid in the tape, rolls for partially closing the tape, and additional rolls for causing the tape to maintain the material therein, all of said rolls being operatively connected together and means for driving said rolls.

In testimony whereof I have signed my name to this specification.

WINSTON F. STOODY.